No. 752,641. Patented February 23, 1904.

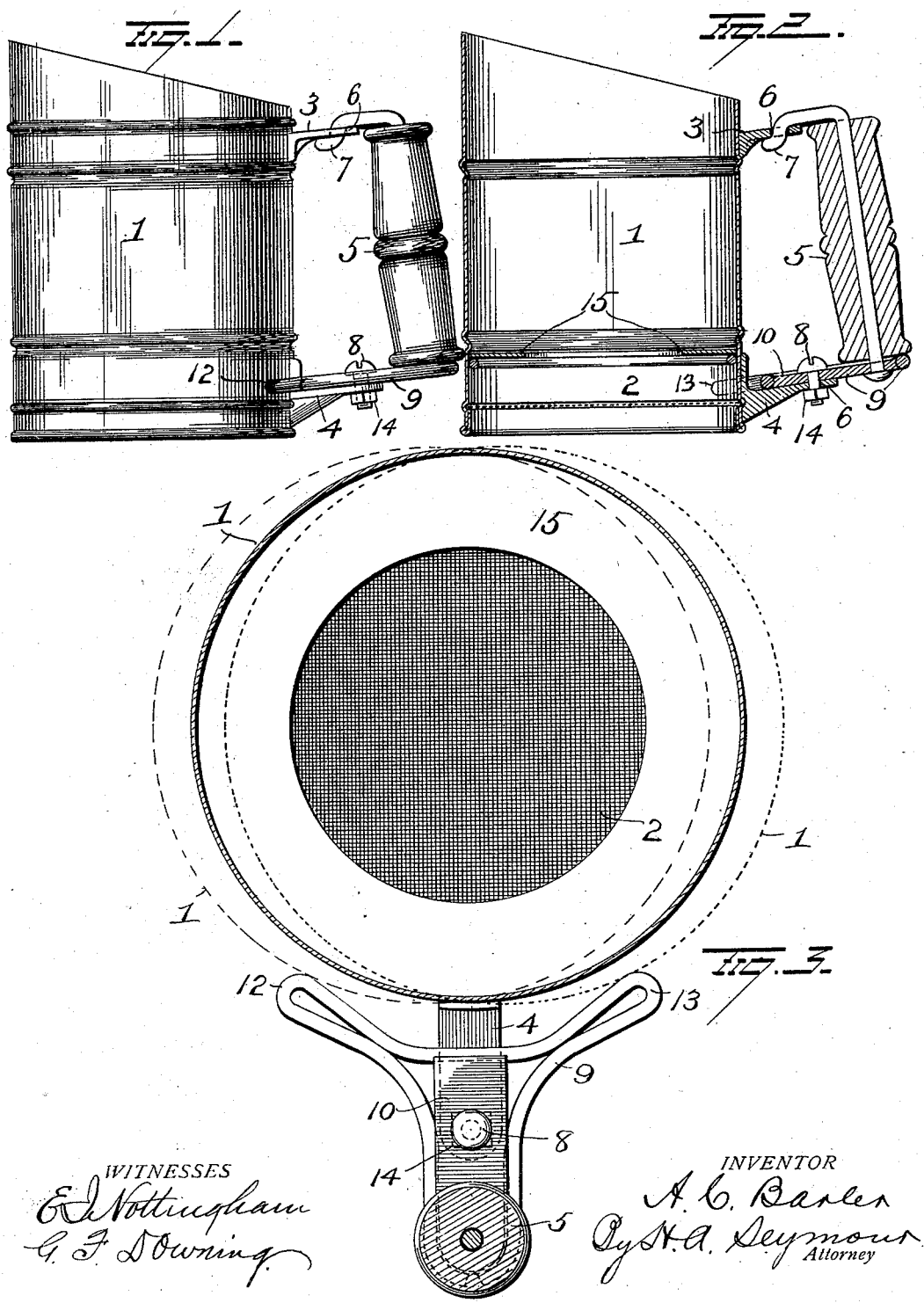

UNITED STATES PATENT OFFICE.

AUGUSTUS C. BARLER, OF CHICAGO, ILLINOIS.

FLOUR-SIFTER.

SPECIFICATION forming part of Letters Patent No. 752,641, dated February 23, 1904.

Application filed July 11, 1902. Serial No. 115,223. (No model.)

*To all whom it may concern:*

Be it known that I, AUGUSTUS C. BARLER, of Chicago, in the county of Cook and State of Illinois, have invented certain new and useful Improvements in Flour-Sifters; and I do hereby declare the following to be a full, clear, and exact description of the invention, such as will enable others skilled in the art to which it appertains to make and use the same.

My invention relates to an improvement in flour-sifters, the object of the invention being to so construct a sifter that the proper passage of the flour through the meshes of the wire-gauze will be insured without the use of an agitator or other device commonly used for forcing the flour through the gauze.

A further object is to construct a flour-sifter which can be operated with one hand to agitate the flour and cause it to pass freely through the meshes of the wire-gauze and without the use of any internal device for stirring the flour and pressing it through the meshes of the gauze.

A further object is to improve the construction of flour-sifters in other respects, to render it convenient and easy to handle, simple in construction, and efficient in operation.

With these objects in view my invention consists in certain novel features of construction and combinations of parts, as will be hereinafter more fully described, and pointed out in the claims.

In the accompanying drawings, Figure 1 is a view in side elevation of my improved sifter. Fig. 2 is a view in vertical section, and Fig. 3 is a transverse sectional view of same.

1 represents a flour scoop or receptacle having a wire-gauze bottom 2 and provided on its outer surface with the outwardly-projecting arms 3 and 4. These arms constitute the supporting means to which handle 5 is pivotally mounted and are each adjacent to their outer ends provided with a hole 6, the hole in the upper arm 3 receiving the hook 7, secured in the upper end of handle 5, while the hole in the lower arm 4 receives the bolt 8, which pivotally connects the frame 9, secured to the lower end of said handle. The frame 9 is preferably formed of wire and bent in the form shown in Fig. 3 and is provided with a plate 10, which extends from the end 11 of the frame to a point between ends 12 and 13 thereof. This plate 10 constitutes the medium by which the frame is pivotally attached to arm 4, the attachment being effected by the bolt 8 passing through the alining holes formed in said plate and arm, respectively, and the nut 14. Thus it will be seen that the means described for effecting the attachment described is removable and that the handle may be readily and quickly detached and placed within the scoop or receptacle, permitting the sifters to be crated in compact form for shipment.

The arm 3 is preferably shorter than the arm 4, and the hole in the latter is so located with respect to the hole in the former that the handle 5 is made to incline toward the top or upper end of the scoop or receptacle, thus permitting the handle to be held without cramping the wrist of the operator and still permit the scoop or receptacle to be held in a horizontal position.

It will be seen that the handle is pivotally connected with the scoop or receptacle at points removed outwardly from the vertical wall of the latter, so that when the handle is held by the operator and moved back and forth in a horizontal direction the scoop or receptacle will be made to oscillate on its pivotal connection with the handle, the oscillations being limited by the engagement of the scoop or holder with the laterally-projecting arms 12 and 13 of frame 9. The scoop or receptacle being thus made to abruptly strike the arms 12 and 13 alternately, the result will be that the contents of the scoop or receptacle will be shaken and kept sufficiently loose to prevent packing and clogging in the meshes of the wire-gauze. Thus flour can be effectually sifted by means of my improved sifter without the use of any internal agitator, and the whole operation can be easily performed with one hand, leaving the other hand of the operator entirely free to manipulate and distribute the sifted flour.

In order to insure the success of a flour-sifter having no internal means for stirring the flour and pressing it through the wire-gauze, it is important to provide means for preventing packing of the flour into a mass and also to avoid possibility of the flour clogging the meshes of the wire-gauze. In my sifter the means for preventing the objectionable features above referred to consist of an internal annular flange 15, disposed horizontally within the receptacle a short distance above the wire-gauze. This flange is comparatively narrow, but is ample to support the body of flour in the receptacle to an extent sufficient to prevent packing of the flour without unduly impeding or interrupting the passage of the flour to and its exit through the meshes of the wire-gauze. Thus when the sifter is operated to shake the receptacle by rapidly-recurring blows against the wall thereof the flour immediately over the wire-gauze being relieved of the weight of the bulk of flour by the annular flange will pass readily through the meshes of the gauze equally as effectually as would be the case were an agitator or rubber provided for pressing it through and without permitting the passage of foreign particles contained in the flour, as is frequently the case with sifters employing internal agitators or rubbers.

It is evident that changes in the construction and relative arrangements of the several parts might be made without avoiding my invention, and hence I would have it understood that I do not restrict myself to the particular construction and arrangement of parts shown and described; but, Having fully described my invention, what I claim as new, and desire to secure by Letters Patent, is—

1. The combination with a sifter and a handle pivotally connected at its upper and lower ends to the sifter, of arms fixed to the handle and forming abutments on the opposite sides thereof, substantially as and for the purpose described.

2. The combination with a sifter and upper and lower arms projecting therefrom, of a frame pivoted to one of said arms and having portions terminating in proximity to the sifter on opposite sides of the handle, and a handle secured to the said frame and pivotally secured to the other projecting arm.

3. The combination with a sifter and fixed arms projecting outwardly therefrom, of a triangular frame pivotally connected to one of said fixed arms, two members of said frame terminating near the wall of the sifter so as to strike the same alternately when the frame is vibrated, a handle pivoted to the third member of said triangular frame and a pivotal connection between the other end of said handle and the other fixed arm on the sifter.

In testimony whereof I have signed this specification in the presence of two subscribing witnesses.

AUGUSTUS C. BARLER.

Witnesses:
STEPHEN G. HAVIGHERST,
HERBERT P. THOMAS.